United States Patent

Hofmann et al.

[11] Patent Number: 6,149,247
[45] Date of Patent: Nov. 21, 2000

[54] HYDRAULIC BRAKE SYSTEM FOR A VEHICLE

[75] Inventors: Dirk Hofmann, Ludwigsburg; Juergen Binder, Stuttgart; Martin Pfau, Weissach; Eberhardt Schunck, Landau, all of Germany

[73] Assignee: Robert Bosch GmbH, Stuttgart, Germany

[21] Appl. No.: 09/142,757

[22] PCT Filed: Nov. 6, 1997

[86] PCT No.: PCT/DE97/02567

§ 371 Date: Sep. 14, 1998

§ 102(e) Date: Sep. 14, 1998

[87] PCT Pub. No.: WO98/31576

PCT Pub. Date: Jul. 23, 1998

[30] Foreign Application Priority Data

Jan. 15, 1997 [DE] Germany ............................ 197 01 070

[51] Int. Cl.[7] ........................................ B60T 8/32
[52] U.S. Cl. ..................... 303/113.4; 303/113.2
[58] Field of Search ............... 303/113.1–113.5, 303/116.1, 116.2, 119.1, 119.2

[56] References Cited

U.S. PATENT DOCUMENTS

| | | | |
|---|---|---|---|
| 5,236,256 | 8/1993 | Schmidt et al. | 303/113.4 |
| 5,261,730 | 11/1993 | Steiner et al. | 303/113.4 |
| 5,281,012 | 1/1994 | Binder et al. | 303/113.5 |
| 5,342,120 | 8/1994 | Zimmer et al. | 303/113.4 |
| 5,397,174 | 3/1995 | Willmann | 303/113.5 |
| 5,492,394 | 2/1996 | Kusano et al. | 303/113.5 |
| 5,547,264 | 8/1996 | Tozu et al. | 303/113.5 |
| 5,553,929 | 9/1996 | Rivard et al. | 303/113.1 |
| 5,586,814 | 12/1996 | Steiner | 303/113.1 |
| 5,588,718 | 12/1996 | Winner et al. | 303/113.1 |

FOREIGN PATENT DOCUMENTS

WO 97/46408 12/1997 WIPO.

*Primary Examiner*—Chris Schwartz
*Attorney, Agent, or Firm*—Ronald E. Greigg; Edwin E. Greigg

[57] ABSTRACT

The invention relates to a hydraulic vehicle brake system with a hydraulic pump and a high pressure hydraulic accumulator for external power braking and a conventional master cylinder that is used as a braking power set point adjuster for external power braking and is used to actuate the brake system by muscle power in the event of a failure of the external power brake system. The system connects an intake side of the hydraulic pump to a low pressure hydraulic accumulator into which brake fluid travels from the wheel brake cylinders when the wheel brake pressure decreases. The system has the advantage that no connections of the hydraulic pump to a reservoir of the master cylinder are necessary, which in the event of a leak, would jeopardize the function of both the external power service brake system and the muscle power auxiliary brake system.

5 Claims, 2 Drawing Sheets

HYDRAULIC BRAKE SYSTEM FOR A VEHICLE

PRIOR ART

The invention is based on a hydraulic vehicle brake system for a vehicle with an external power service brake system and a muscle power auxiliary brake system.

A vehicle brake system of this kind has been disclosed by the S.A.E. Paper 96 0991. The known vehicle brake system has a master cylinder which is connected to wheel brake cylinders with the interposition of at least one block valve. Furthermore, the known vehicle brake system has a hydraulic pump that aspirates the brake fluid from a reservoir and feeds it into a high pressure hydraulic accumulator. The high pressure hydraulic accumulator constitutes an external energy accumulator and the hydraulic pump, together with the high pressure hydraulic accumulator, constitutes an external energy source. The wheel brake cylinders are connected to the high pressure hydraulic accumulator or to the pressure side of the hydraulic pump by way of brake pressure increase valves. The wheel brake cylinders can be connected to the reservoir by way of brake pressure reduction valves connected after each of the wheel brake cylinders.

For external power braking, the at least one block valve is closed and the brake pressure increase valves are opened so that pressurized brake fluid flows out of the high pressure hydraulic accumulator into the wheel brake cylinders. Desired wheel brake pressures in the wheel brake cylinders and brake moments thus generated can be adjusted and changed by means of the brake pressure increase valves and the brake pressure decrease valves in a manner that is known per se. The master cylinder, which is hydraulically separated from the wheel brake cylinders during external power braking by means of the at least one closed block valve, is thus used exclusively as a brake moment set point adjuster and the wheel brake pressure is adjusted as a function of the actuation of this set point adjuster.

For auxiliary braking, e.g. upon failure of the external energy source, braking can be executed in the conventional manner by means of the master cylinder, for example, by means of automatic opening of the block valve and the automatic return of the brake pressure increase valves and brake pressure decrease valves to their closed position.

ADVANTAGES OF THE INVENTION

The vehicle brake system according to the invention has a low-pressure hydraulic accumulator, from which the hydraulic pump aspirates brake fluid and into which the brake fluid flows from the wheel brake cylinders, when the brake pressure decrease valve is opened in order to reduce the wheel brake pressure. Through the use of the low pressure hydraulic accumulator, a brake fluid reservoir can be eliminated, at least for the external power brake system, the hydraulic pump is not connected to a brake fluid reservoir of the master cylinder, and during external power braking, no brake fluid flows from the wheel brake cylinders back in the direction of the master cylinder or into its reservoir. The external power brake system constitutes a closed system that assures a high degree of reliability against failure. No hydraulic connections to the reservoir of the master cylinder are required and no hydraulic lines are needed as an intake line for the hydraulic pump and as return lines from the wheel brake cylinders. First, this has the advantage that an existing master cylinder with a brake fluid reservoir placed on it can be used without connections having to be attached to the reservoir. Another advantage is that this kind of connections and hydraulic lines bring with them the risk of leaks. A leak in one of these connections of the reservoir or of the hydraulic lines mentioned would have the fatal result that it would affect both the external power brake system and the muscle power brake system and thus render the entire vehicle brake system nonfunctional. The vehicle brake system according to the invention therefore has the advantage that its external power service brake system and its muscle power auxiliary brake system are redundant and thus has the advantage of a considerably increased reliability against failure.

Advantageous improvements and updates of the invention disclosed herein after are the subject of the dependent claims.

BRIEF DESCRIPTION OF THE DRAWINGS

The invention will be explained in more detail below in conjunction with two exemplary embodiments. The two FIGS. show flow diagrams for two exemplary embodiments of a vehicle brake system according to the invention.

DESCRIPTION OF THE EXEMPLARY EMBODIMENTS

Figure 1:
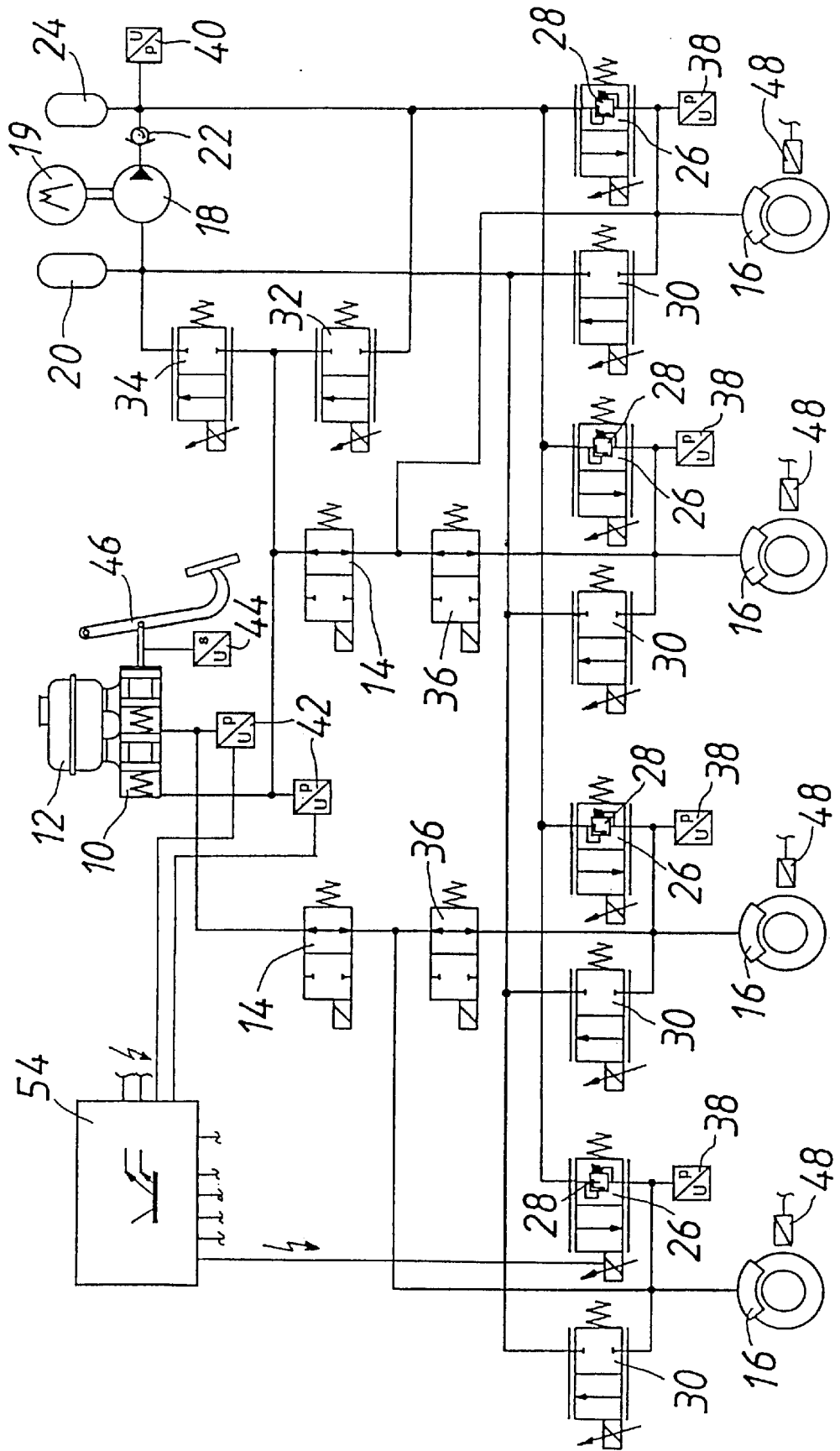

The vehicle brake system according to the invention, which is represented in FIG. 1, has a tandem master cylinder 10 with a brake fluid reservoir 12 placed on it, which is connected to two brake circuits. In each brake circuit, the master cylinder 10 is connected to a block valve 14 that is open in its normal position, by way of which wheel brake cylinders 16 are hydraulically connected to the master cylinder 10.

Furthermore, the vehicle brake system according to the invention, which is represented in FIG. 1, has a hydraulic pump 18 with a pump motor 19, whose intake side is connected to a low pressure hydraulic accumulator 20 and whose pressure side is connected to a high pressure hydraulic accumulator 24 with the interposition of a check valve 22. The wheel brake cylinders 16 are connected to the pressure side of the hydraulic pump 18 and to the high pressure hydraulic accumulator 24 by way of brake pressure increase valves 26 that are closed in their normal position and into which the differential pressure valves 28 are integrated. The wheel brake cylinders 16 are hydraulically connected to the low pressure hydraulic accumulator 20 and the intake side of the hydraulic pump 18 by way of the brake pressure decrease valves 30 that are connected after the wheel brake cylinders 16 and are closed in their normal position.

Two pedal path valves 32, 34, which are closed in their normal positions, are disposed in series in a hydraulic line that leads from the pressure side to the intake side of the hydraulic pump 18 and between these valves, a displacement chamber of the master cylinder 10 is connected, in the exemplary embodiment shown, the floating piston displacement chamber.

In the exemplary embodiment shown, the wheel brake cylinders 16 of the vehicle wheels of one vehicle axle are connected jointly to a displacement chamber of the tandem master cylinder 10, i.e. are connected to a brake circuit, and the wheel brake cylinders 16 of the rear wheels are connected to the floating piston displacement chamber which, as already explained, is also connected between the pedal valves 32, 34. A compensation valve 36 that is open in its normal position is disposed in a brake line leading from the block valve 14 to one of the wheel brake cylinders 16 and the wheel brake cylinders 16 of the vehicle wheels of one vehicle axle are hydraulically connected to each other by way of the compensation valve 36 and can be separated from each other by closing this valve.

The vehicle brake system according to the invention has wheel fluid pressure sensors 38 in each wheel brake cylinder 16, an external pressure sensor 40 on the high pressure hydraulic accumulator 24, a pressure sensor 42 for each displacement chamber of the master cylinder 10, and a pedal path sensor 44 for a brake pedal 46 which can actuate the master cylinder 10. Furthermore, wheel pressure sensors 48 are provided on each vehicle wheel.

Figure 2:
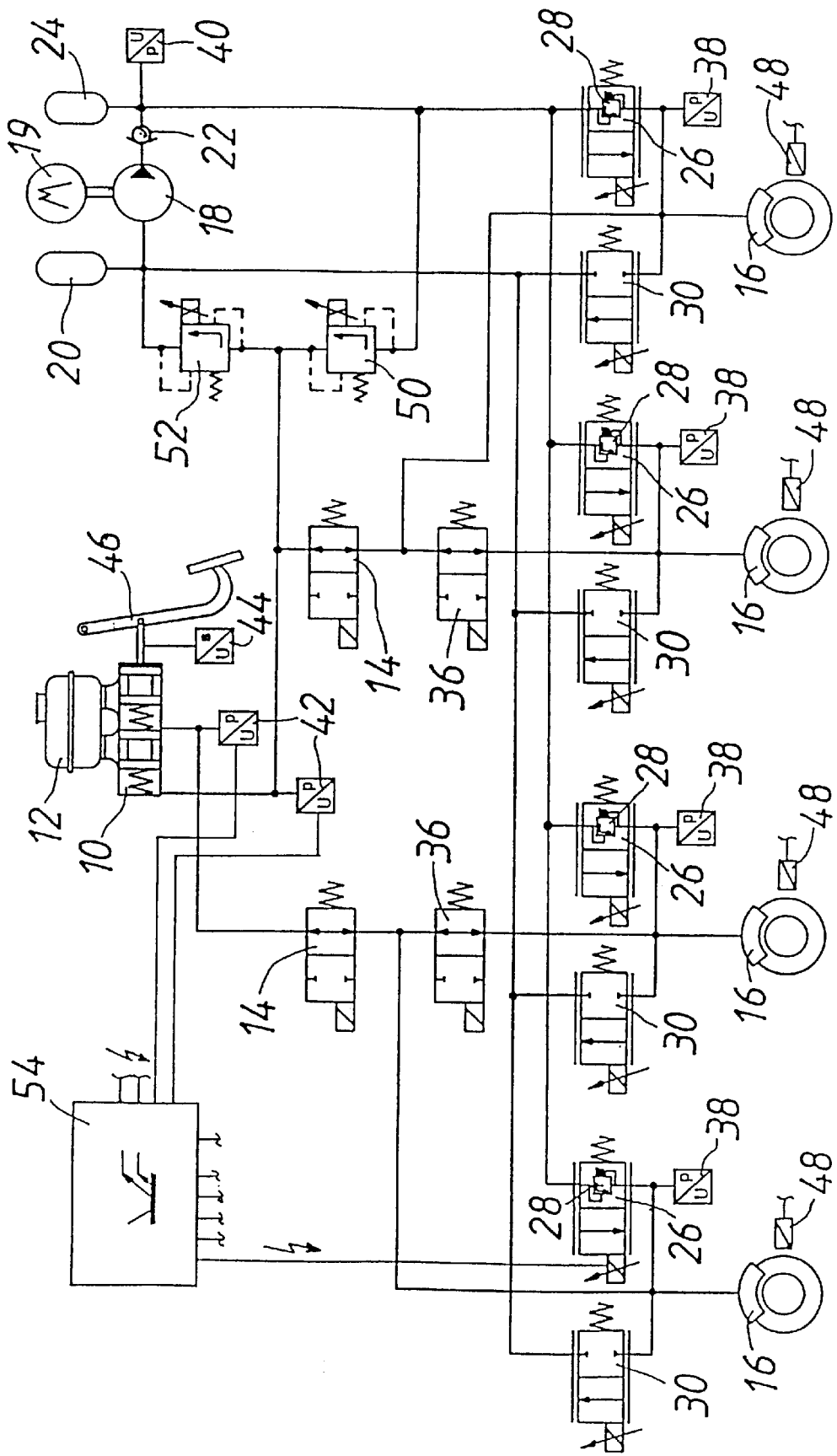

All of the valves 14, 26, 30, 32, 34, 36 in the exemplary embodiment shown are embodied as 2/2-way solenoid valves. The brake pressure increase valves and brake pressure decrease valves 28, 30, like the pedal path valves 32, 34, can be replaced with a 3/3-way solenoid valve (not shown). The brake pressure increase valves and brake pressure decrease valves 28, 30 and the pedal path valves 32, 34 are embodied as proportional valves in order to improve performance quality. As shown in FIG. 2, the pedal path valves can also be embodied as proportional pressure valves 50, 52. Incidentally, the vehicle brake system according to the invention, which is depicted in FIG. 2, has corresponding reference characters which are identical to the vehicle brake system depicted in FIG. 1 and functions in the same manner. With regard to FIG. 2, please refer to the corresponding embodiments in FIG. 1. The control of the valves 14, 26, 30, 32, 34, 36 and of the pump motor 19 is carried out by means of an electronic control device 54, which receives signals from the pressure sensors 38, 40, 42, the pedal path sensor 44, and the wheel rotation sensors 48.

External Power Braking

For external power braking, the block valves 14 are closed, i.e. the master cylinder 10 is hydraulically separated from the wheel brake cylinders 16. For external power braking, the master cylinder 10 is used as a brake power set point adjuster. The pressure in the displacement chambers is measured with the pressure sensors 42 connected to the displacement chambers of the master cylinder 10. This pressure is a function of the force with which the brake pedal 46 is stepped on; these two pressure sensors 42 will therefore be referred to below as pedal force sensors. The signal of one of the two pedal force sensors 42 is consulted for external power braking; the second pedal force sensor 42 is provided redundantly for the sake of safety, in case the one pedal force sensor 42 fails.

The hydraulic pump 18 and the high pressure hydraulic accumulator 24 constitute an external energy source and the high pressure hydraulic accumulator 24 constitutes an external energy accumulator, whose pressure is measured with the external pressure sensor 40 connected to it. Brake fluid is withdrawn from the high pressure hydraulic accumulator 24 for external power braking. The high pressure hydraulic accumulator 24 is placed under pressure by the hydraulic pump 18, wherein a replenishing charge from time to time is sufficient, i.e. the hydraulic pump 18 is only switched on intermittently.

With the brake pressure increase valves and the brake pressure decrease valves 26, 30, a wheel brake pressure is adjusted in the wheel brake cylinders 16, which is a function of the pressure generated in the master cylinder 10 by means of stepping on the brake pedal 46. Since each wheel brake cylinder 16 is associated with a brake pressure increase valve and a brake pressure decrease valve 26, 30, after the closing of the compensation valve 36, the wheel brake pressure can be regulated in the wheels individually. A slip regulation is possible in a manner that is known per se by means of wheel brake pressure modulation using the brake pressure increase valves and brake pressure decrease valves 26, 30. Provided that no individual-wheel pressure regulation is taking place, the wheel brake pressure in a number of wheel brake cylinders 16, for example in the wheel brake cylinders 16 of the vehicle wheels of one vehicle axle, or in all of the wheel brake cylinders 16 can be jointly regulated with a brake pressure increase valve and a brake pressure decrease valve 26, 30.

If necessary, the hydraulic pump 18 can replenish the high pressure hydraulic accumulator 24 from the reservoir 12 of the master cylinder 10 by means of opening the pedal path valve 34 disposed on the intake side of the hydraulic pump 18 when the master cylinder 10 is not actuated. A refilling of the high pressure hydraulic accumulator 24 can be required if, for example due to heat expansion, brake fluid from the high pressure hydraulic accumulator 24 has gotten into the reservoir 12.

The two pedal path valves 32, 34, together with the two hydraulic accumulators 20, 24 and the hydraulic pump 18, constitute an active pedal path simulator for the external power braking: during external power braking, the block valves 14 are closed so that no brake fluid can be displaced out of the master cylinder 10 in the direction of the wheel brake cylinders 16. In order to produce a pedal path in spite of this, the pedal path valve 34 disposed on the intake side of the hydraulic pump 18 is opened until the desired pedal path has been achieved. In order to reset the brake pedal 46, the pedal path valve 32 disposed on the pressure side of the hydraulic pump 18 is opened so that brake fluid flows out of the high pressure hydraulic accumulator 24 into the master cylinder 10 and resets the master cylinder along with the brake pedal 46.

The pedal path that is measured with the pedal path sensor 44 is adjusted as a function of the pressure generated in the master cylinder 10, which is a function of the force with which the brake pedal 46 is stepped on and can be measured with the pedal force sensors 42. In this manner, any desired pedal force/path characteristic curve can be adjusted. Also, the pedal force/path characteristic curve can be easily changed by virtue of the fact that a control algorithm, with which the electronic control device 54 controls the pedal path valves 32, 34, is changed. It is not necessary to change of the hydraulic components of the vehicle brake system. As a result, it is possible to adapt the vehicle brake system to various vehicles in a simple fashion. It is also conceivable to adapt the pedal force/path characteristic curve to the wishes of the respective driver.

The active pedal path simulator 18, 20, 24, 32, 34 can also be realized using proportional pressure valves 50, 52 in lieu of the proportional path valves 32, 34 as pedal path valves, as is shown in FIG. 2.

Auxiliary Brake System

Upon failure of the external power brake system, i.e. the service brake system, the vehicle brake system according to the invention can be actuated by muscle power as an auxiliary brake system: to do this, all of the valves 14, 26, 30, 32, 34, 36 remain in their normal position. By stepping on the brake pedal 46, the master cylinder 10 is actuated in the same way as in service braking. Brake fluid displaced from the displacement chambers of the master cylinder 10 travels through the open block valves 14 and the open compensation valves 36 into all of the wheel brake cylinders 16. The realization of the active pedal path simulator, which is not effective during muscle power braking, by means of the two pedal path valves 32, 34 has the advantage that during muscle power braking, it does not admit any of the brake fluid displaced from the master cylinder 10 and does not lengthen the pedal path so that no pedal path is lost and the brake fluid displaced from the master cylinder 10 flows only to the wheel brake cylinders 16. This means that the pedal path is fully exploited during muscle power braking.

The vehicle brake system according to the invention is redundantly embodied and in particular, has the advantage of a high degree of reliability against failure. Upon failure of an arbitrary hydraulic component of the vehicle brake system, it can be actuated with muscle power at least as an auxiliary brake system.

The foregoing relates to a preferred exemplary embodiment of the invention, it being understood that other variants and embodiments thereof are possible within the spirit and scope of the invention, the latter being defined by the appended claims.

What is claimed is:

1. A hydraulic vehicle brake system with an external power service brake system and a muscle power auxiliary brake system, comprising a master cylinder (10) that is connected to at least one wheel brake cylinder (16) through a block valve (14), a brake fluid reservoir (12) placed on said master cylinder and which communicates with the master cylinder, a hydraulic pump (18) including a pressure side which is connected directly to a high pressure hydraulic accumulator (24) and is connected to the at least one wheel brake cylinder (16) through a brake pressure increase valve (26), a brake pressure decrease valve (30) that is connected subsequent to the wheel brake cylinder, the vehicle brake system has a fluid tight low pressure hydraulic accumulator (20) being closed in relation to atmosphere and connected to an intake side of the hydraulic pump (18) and connected to the wheel brake cylinder (16) through the brake pressure decrease valve (30).

2. The vehicle brake system according to claim 1, in which the master cylinder (10) is embodied as a tandem master cylinder (10) that is connected to two different brake circuits that each have at least one wheel brake cylinder (16).

3. The vehicle brake system according to claim 2, in which the wheel brake cylinders (16) of the vehicle wheels of a same vehicle axle are connected to one brake circuit and are connected to each other brake cylinder by way of a compensation valve (36).

4. The vehicle brake system according to claim 1, in which the vehicle brake system has a brake slip regulating apparatus (26, 30, 48, 54).

5. The vehicle brake system according to claim 1, in which the master cylinder (10) has a pedal force sensor (44) and a pedal path sensor (42) as well as first and second pedal path valves (32, 34; 50, 52), wherein the first pedal path valve (34; 52) is interposed between the master cylinder (10) and the intake side of the hydraulic pump (18) or the low pressure hydraulic accumulator (20) and wherein the second pedal path valve (32; 50) is interposed between the master cylinder (10) and the pressure side of the hydraulic pump (18) or the high pressure hydraulic accumulator (24).

\* \* \* \* \*